United States Patent
Pawar et al.

(10) Patent No.: US 10,716,158 B1
(45) Date of Patent: Jul. 14, 2020

(54) CONFIGURATION OF CARRIER-AGGREGATION SERVICE WITH DUAL-CONNECTIVITY SERVICE

(71) Applicant: Sprint Spectrum L.P., Overland Park, KS (US)

(72) Inventors: Hemanth B. Pawar, Brambleton, VA (US); Krishna Sitaram, Chantilly, VA (US); Shilpa K. Srinivas, Brambleton, VA (US)

(73) Assignee: Sprint Spectrum L.P., Overland Park, KS (US)

( * ) Notice: Subject to any disclaimer, the term of this patent is extended or adjusted under 35 U.S.C. 154(b) by 0 days.

(21) Appl. No.: 16/249,378

(22) Filed: Jan. 16, 2019

(51) Int. Cl.
*H04W 72/04* (2009.01)
*H04W 76/16* (2018.01)
*H04L 5/00* (2006.01)

(52) U.S. Cl.
CPC .............. *H04W 76/16* (2018.02); *H04L 5/001* (2013.01); *H04W 72/0453* (2013.01); *H04W 72/0486* (2013.01)

(58) Field of Classification Search
CPC ............. H04W 76/16; H04W 72/0453; H04W 72/0486; H04L 5/001
See application file for complete search history.

(56) References Cited

U.S. PATENT DOCUMENTS

| | | | |
|---|---|---|---|
| 6,490,452 B1 | 12/2002 | Boscovic et al. | |
| 9,516,549 B1 | 12/2016 | Aksu | |
| 2013/0208615 A1 | 8/2013 | Ishikura et al. | |
| 2013/0322370 A1 | 12/2013 | Fong et al. | |
| 2014/0185526 A1 | 7/2014 | Aksu et al. | |
| 2015/0341945 A1 | 11/2015 | Panchal | |
| 2016/0249222 A1 | 8/2016 | Li et al. | |
| 2017/0150511 A1 | 5/2017 | Chmiel et al. | |
| 2019/0357057 A1* | 11/2019 | Cirkic | H04W 24/10 |

OTHER PUBLICATIONS

U.S. Appl. No. 14/828,298, filed Aug. 17, 2015.

* cited by examiner

*Primary Examiner* — Melvin C Marcelo

(57) ABSTRACT

When a UE is served with dual-connectivity service on a first radio access technology (RAT) concurrently with a second RAT, and when a serving base station faces a choice of which additional carrier to add to the UE's connection according to the first RAT for carrier-aggregation service of the UE according to the first RAT, the selection of an additional first-RAT carrier will be made based on a consideration of the carrier's load attributable to first-RAT-only service as compared with dual-connectivity service. For instance, the base station could select an additional first-RAT carrier based on the carrier's load attributable to first-RAT-only service, perhaps for high-priority first-RAT-only service, being threshold low. Or the base station could exclude from the selection a candidate first-RAT carrier based the carrier's load attributable to such first-RAT-only service being threshold high. The base station could then configure carrier-aggregation service of the UE accordingly.

20 Claims, 4 Drawing Sheets

CONFIGURATION OF CARRIER-AGGREGATION SERVICE WITH DUAL-CONNECTIVITY SERVICE

BACKGROUND

A cellular wireless network typically includes a number of base stations that are configured to provide wireless coverage areas, such as cells and cell sectors, in which user equipment devices (UEs) such as cell phones, tablet computers, machine-type-communication devices, tracking devices, embedded wireless modules, and/or other wirelessly equipped communication devices (whether or not user operated) can operate. Each base station could be coupled with a core network that provides connectivity with various application servers and/or transport networks, such as the public switched telephone network (PSTN) and/or the Internet for instance. With this arrangement, a UE within coverage of the cellular network could engage in air interface communication with a base station and could thereby communicate via the base station with various application servers and other entities.

Such a network could operate in accordance with a particular radio access technology (RAT), with communications from the base stations to UEs defining a downlink or forward link and communications from the UEs to the base stations defining an uplink or reverse link.

In accordance with the RAT, each base station could operate on one or more carriers, each of which could be frequency division duplex (FDD), defining separate frequency channels for downlink and uplink communication, or time division duplex (TDD), with a single frequency channel multiplexed over time between downlink and uplink use. Further, on the downlink and uplink, each such carrier could be structured to define various physical channels for carrying information between the base stations and UEs.

Over the years, the industry has embraced various "generations" of RATs, in a continuous effort to increase available data rate and quality of service for end users. These generations have ranged from "1G," which used simple analog frequency modulation to facilitate basic voice-call service, to "4G"—such as Long Term Evolution (LTE), which now facilitates mobile broadband service using technologies such as orthogonal frequency division multiplexing (OFDM) and multiple input multiple output (MIMO). And most recently, the industry is now exploring developments in "5G" and particularly "5G NR" (5G New Radio), which may use a scalable OFDM air interface, advanced channel coding, massive MIMO, beamforming, and/or other features, to support higher data rates and countless applications, such as mission-critical services, enhanced mobile broadband, and massive Internet of Things (IoT).

Overview

When a UE enters into coverage of an example network, the UE could detect threshold strong coverage of a base station (e.g., a threshold strong reference signal broadcast by the base station) on a particular carrier and could then engage in random-access and Radio Resource Control (RRC) signaling to establish an RRC connection through which the base station will serve the UE on that carrier.

Further, if the UE is not already registered for service with the core network, the UE could transmit to the base station an attach request, which the base station could forward to a core-network controller for processing. And the core network controller could then coordinate setup for the UE of one or more bearers extending between the UE and a core-network gateway that provides transport-network connectivity.

Once the UE is so connected and registered, the base station could then serve the UE in a connected mode on the carrier, managing downlink air-interface communication of packet data to the UE and uplink air-interface communication of packet data from the UE.

For example, when packet data for the UE arrives at the core network from a transport network, the data could flow to the UE's serving base station, and the base station could then schedule and provide transmission of that data to the UE on particular downlink air-interface resources of the carrier. Likewise, when the UE has data to transmit on the transport network, the UE could transmit a scheduling request to the base station, the base station could responsively schedule transmission of that data from the UE on particular uplink air-interface resources of the carrier, and the UE could accordingly transmit the data to the base station for forwarding through the core network to the transport network.

As the industry advances from one generation of wireless technology to the next, networks and UEs may also support simultaneous connectivity on connections according to multiple different RATs. With the transition from 4G to 5G, for instance, it is expected that UEs will be configured to support connections according to both RATs concurrently, with an arrangement referred to as EUTRA-NR Dual Connectivity (EN-DC). To facilitate this, a UE could include both a 4G radio that establishes a 4G connection on a 4G carrier with a 4G base station and a 5G radio that establishes a 5G connection on a 5G carrier with a 5G base station. The UE could then be served with packet-data communications on both connections concurrently, with a portion of data flowing over the UE's 4G connection concurrently with another portion of the data flowing over the UE's 5G connection.

More generally, dual-connectivity service of a UE involves the UE having co-existing connections according to multiple different RATs and being served with packet-data communication concurrently on those multiple different-RAT connections. This is to be distinguished from stand-alone (or single-connectivity) service of a UE, where the UE is served with packet-data communication according to just a single RAT, such as with just a 4G connection or just a 5G connection.

Dual-connectivity can thus leverage and/or facilitate transition of a network from one RAT to another. Further, dual connectivity can help to provide UEs with increased peak data rate by multiplexing packet-data onto multiple concurrent connections. For instance, a UE that supports EN-DC service could connect initially with a 4G base station, and the 4G base station could then add a secondary 5G connection for the UE to help increase the UE's peak data rate. Dual-connectivity could thus be desirable for a UE that is or will be engaged in high-throughput communication.

In addition, when a UE is served by a base station according to a given RAT, regardless of whether the service is standalone on that RAT or is part of dual-connectivity on that RAT together with another RAT, the base station and UE could also support carrier-aggregation service on that RAT.

Carrier-aggregation service of a UE on a given RAT involves service of the UE concurrently on an aggregation of multiple carriers according to the RAT. For instance, if a UE is served on a 4G connection by a 4G base station, carrier-aggregation service of the UE could involve that 4G connection encompassing multiple 4G carriers, so that the UE can engage in 4G communication concurrently on those multiple 4G carriers. Implementation of carrier-aggregation service on a given RAT can also help to provide increased peak data rate, as the combined bandwidth of the aggregated carriers provides greater air-interface capacity than any single one of the carriers. Therefore, carrier-aggregation service could be desirable for a UE that is or will be engaged in high-throughput communication.

With carrier-aggregation service, each carrier on which the UE is served is considered a component carrier. One such carrier, perhaps the carrier on which the UE initially connects with the base station, could be considered a primary component carrier (PCC) of the UE's connection and might be the anchor for some or all control-plane signaling between the UE and the base station. Through RRC signaling, the base station could then add one or more additional carriers to the UE's RRC connection as secondary component carriers (SCCs) to help increase the UE's peak data rate.

When a UE is served with dual-connectivity on a first RAT and a second RAT, the UE could also be served with carrier-aggregation on a given one of those RATs (or for that matter on each RAT). With EN-DC, for instance, when a UE has a primary 4G connection with a 4G base station and a secondary 5G connection with a 5G base station, the UE's serving 4G base station could configure the UE's 4G connection to encompass multiple 4G carriers. With this arrangement, the UE could thereby doubly benefit—by having both increased peak data rate from dual-connectivity service and increased peak data rate from carrier-aggregation service.

One technological issue that can arise when a UE is or will be served with dual-connectivity and the UE's serving base station on a given RAT is going to add a carrier to the UE's connection on that RAT, the base station may face a choice of which carrier to add. For example, with EN-DC, if the UE is has a 4G connection on a 4G carrier with a 4G base station and has a 5G connection on a 5G carrier with a 5G base station, the 4G base station may be licensed to operate on two or more additional 4G carriers on which the UE is not currently served, and the 4G base station may face a choice of which of those 4G carriers to add to the UE's 4G connection for 4G carrier-aggregation service.

The present disclosure provides that when a base station is faced with such a choice, the base station will select a carrier based on the carrier having threshold low load attributable to standalone service on the RAT at issue, perhaps specifically high-priority standalone service (such as voice or streaming-media communication) on the RAT at issue. Phrased another way, the base station could exclude from the selection any carrier that has a threshold high level of load attributable to such standalone service on the RAT at issue. Excluding such a carrier from use for carrier-aggregation service of a UE that benefits from dual-connectivity service can help to avoid having that UE unfairly consume resources of the carrier to the detriment of UEs that do not likewise benefit from dual-connectivity service.

For example, if a UE is served with EN-DC including a 4G connection with a 4G base station and a 5G connection with a 5G base station, the UE's serving 4G base station may face a question of which of various candidate 4G carriers to add to the UE's 4G connection for 4G carrier-aggregation service of the UE. To help resolve this question, the 4G base station could consider, for each candidate 4G carrier, whether load attributable specifically to 4G-only service on the carrier is lower than a predefined threshold. And if so, then based at least on that determination, the base station could decide to add the carrier to the UE's 4G connection for 4G carrier-aggregation service. Whereas, if not, then based at least on that determination, the base station could decide to not add that carrier to the UE's 4G connection for 4G carrier-aggregation service.

With this process, if a given 4G carrier has threshold heavy load attributable to 4G-only service rather than EN-DC service, then it could be desirable to forgo adding that carrier to the 4G connection of the UE served with EN-DC, to avoid having service of that dual-connected UE on the 4G carrier consume resources of the carrier that could be used instead for 4G-only service on the carrier. From a fairness standpoint, the UE at issue would already benefit form EN-DC service, so it could be preferable to not let service of that UE burden the carrier that is threshold heavily used for 4G-only service.

Note that at issue here is not merely selecting a carrier for use in carrier-aggregation service based on the carrier having threshold low load generally. Rather, at issue is selecting a carrier for use in carrier-aggregation service for a dual-connected UE based on a consideration of the carrier load attributable to standalone service rather than dual-connectivity service.

These as well as other aspects, advantages, and alternatives will become apparent to those reading the following description, with reference where appropriate to the accompanying drawings. Further, it should be understood that the discussion in this overview and elsewhere in this document is provided by way of example only and that numerous variations are possible.

DETAILED DESCRIPTION

An example implementation will now be described in the context of a network that includes a 4G LTE base station (evolved Node-B (eNB)) and a 5G NR base station (gigabit Node-B (gNB)), and where some UEs may receive 4G-only service by the 4G base station and other UEs may receive EN-DC service including dual-connectivity with the 4G base station and the 5G base station. It should be understood, however, that the principles disclosed herein could extend to apply with respect to other scenarios as well, such as with respect to other radio access technologies. Further, it should be understood that other variations from the specific arrangements and processes described are possible. For instance, various described entities, connections, functions, and other elements could be added, omitted, distributed, re-located, re-ordered, combined, or changed in other ways.

Figure 1:
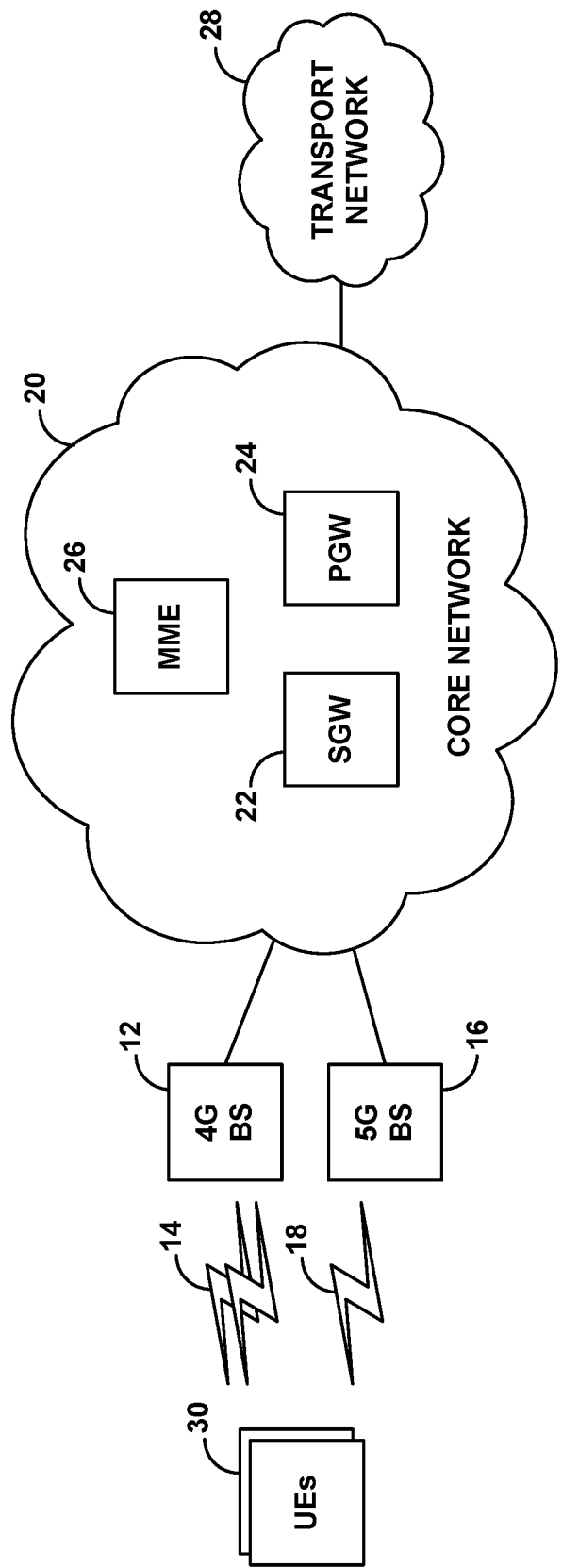
FIG. 1 is a simplified block diagram of an example network arrangement in which features of the present disclosure can be implemented.

FIG. 1 depicts an example network including a 4G base station 12 that is configured to provide 4G service on each of a plurality of 4G carriers 14, and a 5G base station 16 that is configured to provide 5G service on at least one 5G carrier 18. These base stations could be collocated with each other at a common cell site or could be adjacent to each other, in any event providing overlapping coverage so that UEs could be positioned concurrently in coverage of both base stations. Further, the 4G service and 5G service could differ from each other in various ways now known or later developed, such as with one implementing variable subcarrier spacing and the other having fixed subcarrier spacing, with one having flexible TDD configuration and the other having fixed TDD configuration, with one having different symbol time segments than the other, and/or with one making different use of MIMO technologies than the other, among other possibilities.

In representative 4G and 5G implementations, each carrier could be FDD or TDD and could thus define separate downlink and uplink frequency channels or a single frequency channel multiplexed over time between downlink and uplink use. In any event, each frequency channel of a carrier could be characterized by a defined frequency bandwidth (width in RF spectrum) and center frequency and may have a unique carrier identifier.

Coverage provided by a 4G or 5G base station on a given carrier could be divided over time into frames, subframes, timeslots, and symbol time segments, and over frequency into subcarriers, thus defining an array of air-interface resource elements in which subcarriers can be modulated to carry data. Further, in each subframe, timeslot, or the like, the resource elements could be divided into groups defining physical resource blocks (PRBs), which the base station could allocate for use to carry data to or from served UEs.

As further shown, the example 4G and 5G base stations are both connected with a common core network 20, such as an Enhanced Packet Core (EPC) network or Next Generation Core (NGC) network. In the example shown, the core network includes a serving gateway (SGW) 22, a packet data network gateway (PGW) 24, and a mobility management entity (MME) 26.

In practice, the 4G base station could have an interface with the SGW, the SGW could have an interface with the PGW, and the PGW could provide connectivity with a transport network 28. Further, the 4G base station could have an interface with the MME, and the MME could have an interface with the SGW, so that the MME could coordinate setup of bearer connections for a UE to enable the UE to engage in packet-data communication via the UE's 4G connection.

Likewise, the 5G base station could have an interface with the SGW and MME, and the MME could have an interface with the SGW, so that the MME could coordinate setup of bearer connections for a UE to enable the UE to engage in packet-data communication via the UE's 5G connection. Alternatively, the 5G base station may operate as a secondary node with the 4G base station as master node for EN-DC service, in which case the 4G base station may be the anchor for signaling with the MME and perhaps further for bearer communication for the EN-DC service.

FIG. 1 further depicts example UEs 30 that may concurrently or from time to time be within coverage of 4G base station 12 and/or 5G base station 16. In a representative implementation, all of these UEs are configured with a 4G radio and associated components to establish a 4G connection with the 4G base station and to be served according to 4G over that connection. And at least some of the UEs may also be configured with a 5G radio and associated components to establish a 5G connection with the 5G base station and to be served according to 5G over that connection. Some of the UEs may thus be served with 4G-only service by the 4G base station, even if the UEs include 5G radios and also support EN-DC service. And other of the UEs may be served with EN-DC service by the 4G base station and the 5G base station.

When a UE initially enters into coverage of the 4G base station, the UE could detect coverage of the 4G base station on a particular carrier and the UE could engage in signaling with the base station to establish a 4G RRC connection. In addition, the UE could then engage in attach signaling with the MME via the UE's 4G connection, and the MME could set up one or more bearers for the UE to enable the UE to engage in packet-data communication over the UE's 4G connection.

Further, the 4G base station could establish for the UE a context record and could store in the UE context record various connection, service, and capabilities data for the UE. For instance, the 4G base station could store in the context record an identifier of the UE's established 4G connection and an identifier of the 4G carrier on which the UE is connected. And the 4G base station could obtain and store in the UE context record an indication of whether the UE supports EN-DC service, which could be based on whether the UE subscribes to EN-DC service and whether the UE has a 5G radio and other circuitry and logic to support EN-DC service.

Once the UE is connected with the 4G base station on the 4G carrier, the 4G base station could serve the UE as discussed above. In particular, when the 4G base station receives packet-data for transmission to the UE, the 4G base station could select downlink PRBs on the 4G carrier to carry the data to the UE, and the base station could schedule and provide transmission of the data to the UE on those PRBs. And when the UE has packet-data for transmission to the 4G base station, the 4G base station could select uplink PRBs on the 4G carrier to carry the data from the UE and could schedule that transmission, and the UE could accordingly transmit the data to the base station on those PRBs.

If the UE supports EN-DC service, the 4G base station could also coordinate setup of EN-DC service for the UE. To do so, the 4G base station could direct the UE to scan for coverage on one or more 5G carriers, and the UE could responsively report to the 4G base station that the UE detects coverage of 5G base station 16 on 5G carrier 18. Given this, the 4G base station could then engage in inter-base-station signaling with the 5G base station to arrange for setup of a 5G RRC connection on the 5G carrier between the 5G base station and the UE, and the 4G base station could further coordinate or engage in signaling with the MME to trigger setup for the UE of a split bearer, so that the UE's packet-data communication can then be multiplexed between the UE's 4G connection and the UE's 5G connection.

With EN-DC service so set up, when the core network had packet-data to transmit to the UE, a portion of the data would flow to the 4G base station and the 4G base station would schedule and provide transmission of that portion of the data over the UE's 4G connection to the UE, and another portion of the data would flow to the 5G base station and the 5G base station would schedule and provide transmission of that other portion of the data over the UE's 5G connection to the UE. Optimally, transmission of these portions of data could occur concurrently over the 4G and 5G connections, with downlink 4G PRBs of the 4G carrier carrying one portion, and with downlink 5G PRBs of the 5G carrier carrying the other portion. The UE could thus receive the transmissions on both connections concurrently and could then reassemble the portions to uncover the intended data transmission.

Likewise, when the UE has data to transmit, the 4G base station could schedule transmission of a portion of the data over the UE's 4G connection to the 4G base station and the UE could accordingly engage in that transmission, and the 5G base station could schedule transmission of another portion of that data over the UE's 5G connection to the 5G base station and the UE could accordingly engage in that transmission. Optimally here too, transmissions of these portions could occur concurrently, with uplink 4G PRBs of the 4G carrier carrying one portion, and with uplink 5G PRBs of the 5G carrier carrying the other portion. And the portions could then be combined at the 4G base station or in the core network.

As further discussed above, the 4G base station could also provide the UE at issue with 4G carrier-aggregation service, by configuring the UE's 4G RRC connection to encompass multiple 4G carriers. In particular, if the 4G base station is serving the UE on just a single 4G carrier, the 4G base station could add at least one more 4G carrier to the UE's RRC connection and then serve the UE on a combination of those 4G carriers. Or if the 4G base station is already providing the UE with 4G carrier-aggregation service, the 4G base station may change one or more of the 4G carriers or may add one or more additional 4G carriers.

To do this, the 4G base station could direct the UE to scan for coverage on one or more 4G carriers on which the UE is not currently being served, and the UE could responsively provide the 4G base station with a measurement report specifying the 4G carriers of sufficient strength that the UE detects. The 4G base station could then select at least one of the reported 4G carriers and could add that 4G carrier to the UE's 4G RRC connection along with the UE's existing 4G carrier(s). In particular, the 4G base station could transmit to the UE an RRC connection reconfiguration message that specifies each of multiple 4G carriers on which the 4G base station will now serve the UE, indexing one carrier as the UE's primary component carrier and each additional carrier as a secondary component carrier. And the base 4G station could update its context record for the UE to indicate the inclusion of the additional 4G carrier in the UE's 4G RRC connection.

The 4G base station could then provide the UE with 4G carrier-aggregation service on the combination of 4G carriers now encompassed by the UE's 4G RRC connection. For instance, when the 4G base station has data to transmit to the UE, the 4G base station could schedule transmission of a portion the data to occur on one or more PRBs of the UE's primary component carrier concurrent with transmission of another portion of the data to occur on one or more PRBs of the UE's secondary component carrier, and the 4G base station could transmit the data to the UE accordingly.

As yet further noted above, the 4G base station could provide a UE with 4G carrier-aggregation service while the UE also receives EN-DC service. In particular, the 4G base station could serve the UE on a combination of 4G carriers concurrent with the 5G base station serving the UE on at least one 5G carrier. Thus, when the core network has packet-data to transmit to the UE, a portion of that data could be provided to the 4G base station and could be transmitted to the UE on PRBs of the UE's multiple 4G carriers, and another portion of the data could be provided to the 5G base station and could be transmitted to the UE, concurrently, on PRBs of the UE's 5G carrier(s).

As explained above, if a UE is going to receive and benefit from EN-DC service, at issue may then be which of multiple candidate 4G carriers the 4G base station should opt to add to the UE's 4G connection for providing the UE with 4G carrier-aggregation service. For instance, if the UE reports detecting multiple candidate 4G carriers to be added to facilitate carrier-aggregation service, and if the 4G base station is not going to add all of the reported 4G carriers to the UE's 4G connection, then at issue is which of the reported 4G carriers the 4G base station should add.

In line with the discussion above, the 4G base station can resolve this issue based at least in part on a consideration of each candidate 4G carrier's respective load attributable to 4G-only service. In particular, for each candidate 4G carrier, the 4G base station could determine the carrier's level of load attributable to 4G-only service, perhaps specifically for high-priority service such as voice or streaming-media service, and the 4G base station could decide base at least in part on that particular level of load whether to add the 4G carrier to the UE's 4G connection.

As noted above, the issue here is specifically carrier load attributable to 4G-only service, rather than load as a general matter. A given 4G carrier could be used to provide 4G connectivity for 4G-only service (i.e., not part of EN-DC service) and could also be used to provide 4G connectivity as part of EN-DC service. Thus, some of the load on the 4G carrier could be attributable to 4G-only service, and other load on the 4G carrier could be attributable to EN-DC service.

To evaluate a carrier's level of load attributable to 4G-only service versus EN-DC service, instances of service on the carrier could be put into buckets based on whether the instances are for 4G-only service or are rather for EN-DC service. And the 4G base station could then evaluate the level of load specifically in the bucket for 4G-only service.

Load in this context could take various forms. For example, load could be the extent of PRB usage on the carrier, such as the percentage of the carrier's PRBs used per unit time such as per frame. As another example, load could be the extent of data communicated on the carrier, such as the quantity of bits or bytes communicated per unit time. And as another example, load could be the extent of UEs served per unit time. Further, load could be defined as a combination of these or other metrics or in other ways.

Carrier load attributable to 4G-only service (as compared with EN-DC service for instance) could likewise take various forms. For example, carrier load attributable to 4G-only service could be carrier load resulting from service of UEs on 4G only, i.e., where the UEs are not concurrently served on 5G. Thus, the carrier load attributable to 4G-only service might be the quantity of PRBs, data, or UEs served per unit time on 4G only or might take other forms, even if any of the UEs served on 4G only happen to support EN-DC service. And as another example, carrier load attributable to 4G-only service could be carrier load resulting from service of UEs that support 4G-only service but do not support EN-DC service. To facilitate these evaluations, the 4G base station could consult UE capability data or other information.

As additionally noted above, the load analysis could be with respect to 4G-only service that is deemed high-priority. Examples of high-priority service may include voice and streaming-media service or perhaps other guaranteed-bit-rate services, among other possibilities. Which particular service is involved could be established based on a type of the bearer over which the UE's communication occurs. For instance, each such bearer could have a respective quality of service class indicator, which could correspond with its service type. And the 4G base station could have a record of that service type in the UE context record, so the 4G base station could determine whether the service type is high-priority and should therefore be included in the measure of level of load attributable to 4G-only service.

The 4G base station could keep track of this load data over time, such as over a recent-sliding-window basis, on a per carrier basis, or the 4G base station could evaluate this load instantly when at issue. For instance, the 4G base station could maintain a table that specifies per 4G carrier the level of load on the carrier as a general matter as well as the level of load on the carrier specifically for 4G-only service (perhaps specifically for high-priority 4G-only service). When the 4G base station faces a question of which of various 4G carrier to add to an EN-DC-served UE for 4G carrier-aggregation service, the 4G base station could then refer to this load data, as a basis to make the decision.

For example, for a given candidate 4G carrier, the 4G base station could determine from the load data whether the carrier's level of load attributable to 4G-only service is predefined threshold low (e.g., at least as low as a predefined threshold deemed to represent low load). If so, then, based at least in part on that determination, the 4G base station could select the 4G carrier to add to the UE's 4G connection for 4G carrier-aggregation service. Whereas, if not, then based at least in part on that determination, then 4G base station could exclude that 4G carrier from selection, i.e., could decide to not add the 4G carrier to the UE's 4G connection for 4G carrier-aggregation service.

And largely the same, for a given candidate 4G carrier, the 4G base station could determine from the load data whether the carrier's level of load attributable to 4G-only service is predefined threshold high (e.g., at least as high as a predefined threshold deemed to represent high load). If so, then, based at least in part on that determination, the 4G base station could exclude that carrier from selection, i.e., could decide to not add the 4G carrier to the UE's 4G connection for 4G carrier-aggregation service. Whereas, if not, then, based at least in part on that determination, the 4G base station could select the 4G carrier to add to the UE's 4G connection for 4G carrier-aggregation service.

Figure 2:
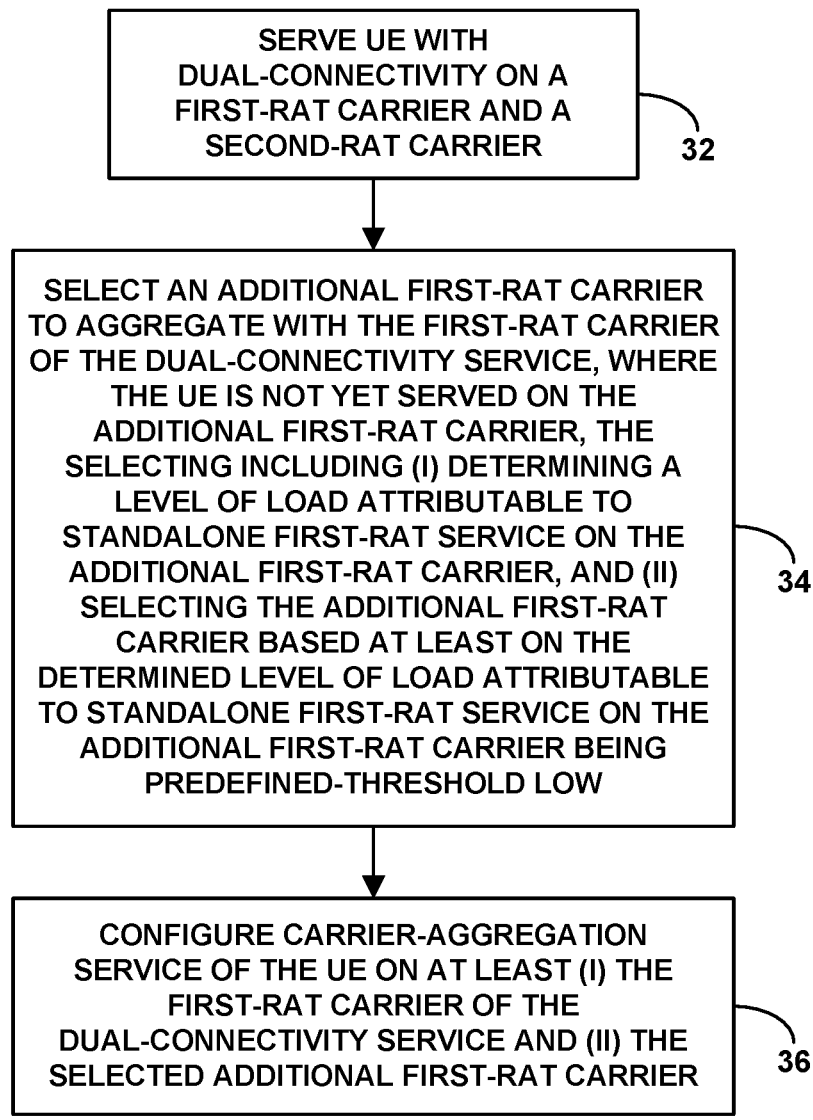
FIG. 2 is a flow chart depicting an example method in accordance with the present disclosure.

FIG. 2 is next a flow chart depicting a method that can be carried out in accordance with the present disclosure for a wireless communication system to configure service of a UE. The wireless communication system supports a first RAT and a second RAT, including operation on carriers according to the first RAT ("first-RAT carriers") and operation on one or more carriers according to the second RAT ("second-RAT carrier(s)").

For instance, with the example above, the first RAT could be 4G LTE and the second RAT could be 5G NR, and the system could support operation on 4G carriers and at least one 5G carrier, such as service provided by a 4G base station on 4G carriers and service provided by a 5G base station on at least one 5G carrier. In an example implementation, the method could be carried out by a base station of the system, such as by a base station that is configured to provide service on multiple carriers according to the first RAT.

As shown in FIG. 2, at block 32, the method includes the system serving the UE with dual-connectivity on a first-RAT carrier and a second-RAT carrier. (For instance, the system could provide the UE with EN-DC service with the UE having a 4G connection on a 4G carrier concurrently with the UE having a 5G connection on a 5G carrier.)

At block 34, the method further includes the system selecting an additional first-RAT carrier to aggregate with the first-RAT carrier of the dual-connectivity service, where the UE is not yet served on the additional first-RAT carrier, and where the selecting includes (i) determining a level of load attributable to standalone first-RAT service on the additional first-RAT carrier, and (ii) selecting the additional first-RAT carrier based at least on the determined level of load attributable to standalone first-RAT service on the additional first-RAT carrier being predefined-threshold low. (For instance, a 4G base station that serves the UE could select an additional 4G carrier to add to the UE's 4G connection based on that carrier's load attributable to 4G-only service being at least as low as a predefined threshold, or not as high as a predefined threshold, among other possibilities.)

And at block 36, the method includes the system configuring carrier-aggregation service of the UE on at least (i) the first-RAT carrier of the dual-connectivity service and (ii) the selected additional first-RAT carrier. (For instance, the UE's serving 4G base station could configure or reconfigure 4G carrier-aggregation service of the UE on the a 4G carrier already encompassed by the UE's 4G connection together with an additional 4G carrier selected in the manner noted above.)

In line with the discussion above, the act of determining the level of load attributable to standalone first-RAT service on the additional first-RAT carrier could involve (i) identifying instances of service on the additional first-RAT carrier based on the identified instances of service being for one or more UEs that support standalone service on the first RAT and that do not support dual-connectivity on the first RAT and the second RAT and (ii) based on the identifying, determining the level of load as load attributable to the identified instances of service.

Alternatively or additionally, the act of determining the level of load attributable to standalone first-RAT service on the additional first-RAT carrier could involve (i) identifying instances of service on the first-RAT carrier based on the identified instances of service being for one or more UEs engaged in standalone communication on the first RAT rather than dual-connectivity service on the first RAT and the second RAT and (ii) based on the identifying, determining the level of load as load attributable to the identified instances of service.

Further, the act of determining the level of load attributable to standalone first-RAT service on the additional first-RAT carrier could involve determining the level of load attributable to standalone first-RAT service on the additional first-RAT carrier based on the standalone first-RAT service having predefined-threshold high priority as discussed above.

Still further, the act of configuring the carrier-aggregation service of the UE on at least the first-RAT carrier of the dual-connectivity service and the selected additional first-RAT carrier could involve (i) transmitting to the UE a control signal that informs the UE of the inclusion of the selected additional first-RAT carrier in a connection of the UE and (ii) updating a base station context record for the UE to indicate the inclusion of the selected additional first-RAT carrier in the connection of the UE.

And yet further, the act of selecting the additional first-RAT carrier could involve excluding, from the selecting, a particular first-RAT carrier based on a determination that the particular first-RAT carrier has a predefined-threshold high level of load attributable to standalone first-RAT service. For instance, the selecting process could involve identifying a set of candidate additional first-RAT carriers (e.g., those that the UE reports having sufficient coverage strength), reducing the set by eliminating from the set any first-RAT carriers based on their each having at least a predefined threshold high load attributable to standalone first-RAT service, and then selecting a first-RAT carrier from one or more that remain in the set after the reduction.

Figure 3:
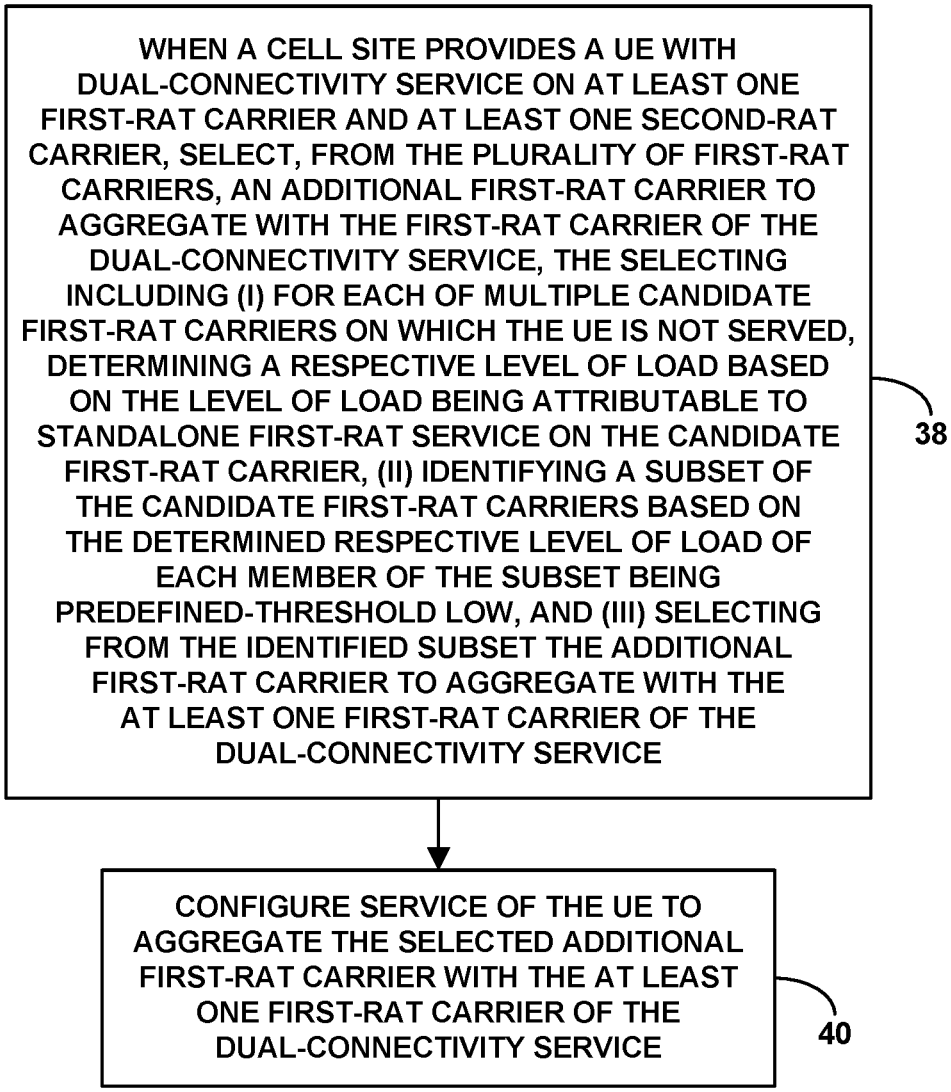
FIG. 3 is another flow chart depicting an example method in accordance with the present disclosure.

FIG. 3 is next a flow chart depicting a method that can be carried out in accordance with the present disclosure to control carrier-aggregation in a system in which a cell site supports operation according to a first RAT and operation according to a second RAT and the cell site is configured to provide wireless service on a plurality of first-RAT carriers and on at least one second-RAT carrier. For instance, the method could apply in a system where a cell site includes collocated 4G and 5G base stations as discussed above, and the method could be carried out by a base station of that cell site and/or by one or more other entities.

As shown in FIG. 3, at block 38, the method includes, when the cell site provides a UE with dual-connectivity service on at least one of the first-RAT carriers and the second-RAT carrier, the system selecting, from the plurality of first-RAT carriers, an additional first-RAT carrier to aggregate with the at least one first-RAT carrier of the dual-connectivity service—i.e., with the at least one first-RAT carrier on which the UE is being served as part of the UE's dual-connectivity service.

As further shown at block 38, this selecting operation includes (i) for each of multiple candidate first-RAT carriers on which the UE is not served, the system determining a respective level of load based on the level of load being attributable to standalone first-RAT service on the candidate first-RAT carrier, (ii) the system identifying a subset (one or more) of the candidate first-RAT carriers based on the determined respective level of load of each member of the subset being predefined-threshold low, and (iii) the system selecting from the identified subset the additional first-RAT carrier to aggregate with the at least one first-RAT carrier of the dual-connectivity service.

And at block 40, the method then includes the system configuring service of the UE to aggregate the selected additional first-RAT carrier with the at least one first-RAT carrier of the dual-connectivity service.

Various features described above can be implemented in the context of this method, and vice versa.

For instance, this method could be carried out with the first RAT being 4G LTE and the second RAT being 5G NR, among other possibilities. Further, the act of determining the level of load based on the level of load being attributable to standalone first-RAT service on the candidate first-RAT carrier can be based on identified instances of service for one or more UEs that support standalone service but not dual-connectivity service and/or could be based on instances of service for one or more UEs engaged in standalone service rather than dual-connectivity service. And the act of determining the level of load based on the level of load being attributable to standalone first-RAT service on the candidate first-RAT carrier can also be focused on first-RAT service that has a predefined threshold high level of priority as discussed above.

And still further, the act of selecting the additional first-RAT carrier could involve excluding, from the selecting, a particular first-RAT carrier based on a determination that the particular first-RAT carrier has a predefined-threshold high level of load attributable to standalone first-RAT service.

Figure 4:
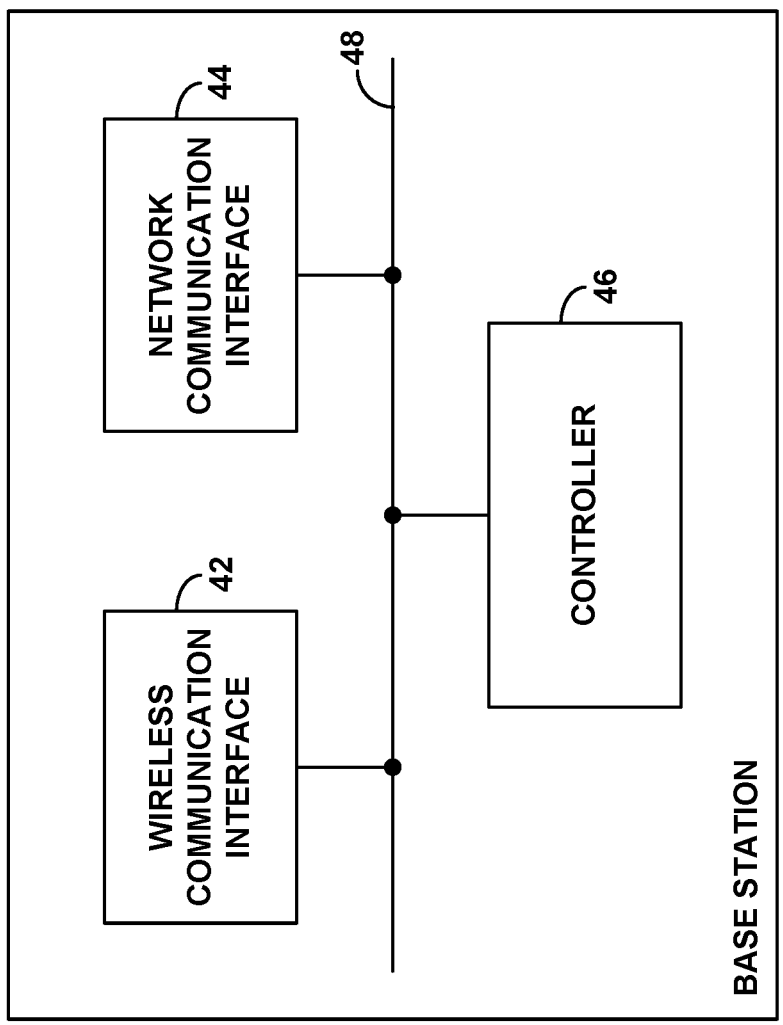
FIG. 4 is a simplified block diagram of an example base station operable in accordance with the present disclosure.

FIG. 4 is a next a simplified block diagram depicting an example base station that could operate in accordance with the present disclosure. As shown, the example base station includes a wireless communication interface 42, a network communication interface 44, and a controller 46, all of which may be communicatively linked together by a system bus, network, or other connection mechanism 48. This base station could be configured to provide wireless service according to a first RAT and could operate on a plurality of first-RAT carriers, and the base station could be implemented in a system that further includes a second base station that is configured to provide wireless service according to a second RAT and that operates on at least one second-RAT carrier, among other possibilities.

The wireless communication interface 42 of the base station could comprise an antenna structure, which could be tower mounted or may could other forms, and associated components such as a power amplifier and a wireless transceiver, so as to facilitate providing a coverage area defining an air interface having a downlink and an uplink, and engaging in transmission and reception of bearer and control data over the air interface in accordance with the first RAT. And the network communication interface 44 could comprise a wired or wireless interface, such as an Ethernet network communication interface, configured to support communication with other entities, such as with other base stations or core-network entities.

Further, controller 46 could comprise a processing unit (e.g., one or more general purpose processors and/or specialized processors) programmed to cause the base station to carry out various operations as discussed above.

For instance, the operations could include, when the first base station is serving a UE with a first-RAT connection on at least one of the first-RAT carriers concurrently with the second base station serving the UE with a second-RAT connection on the second-RAT carrier, selecting an additional first-RAT carrier on which to provide the UE with carrier-aggregation service of the UE together with the at least one-RAT carrier, with the selecting including (i) for each of multiple candidate first-RAT carriers on which the UE is not served, determining a respective level of load based on the level of load being attributable to standalone first-RAT service on the candidate first-RAT carrier, (ii) identifying a subset of the candidate first-RAT carriers based on the determined respective level of load of each member of the subset being predefined-threshold low, and (iii) selecting from the identified subset the additional first-RAT carrier to aggregate with the at least one first-RAT carrier.

And the operations could further include, based on the selecting, configuring and providing carrier-aggregation service of the UE on the at least one first-RAT carrier together with the selected additional first-RAT carrier, while the second base station continues to serve the UE with the second-RAT connection on the second-RAT carrier.

Various features described above can be implemented in this context as well, and vice versa.

The present disclosure also contemplates a non-transitory computer-readable medium being encoded, programmed, storing, and/or otherwise embodying program instructions executable by a processing unit to carry out various features described herein.

Exemplary embodiments have been described above. Those skilled in the art will understand, however, that changes and modifications may be made to these embodiments without departing from the true scope and spirit of the invention.

We claim:

1. A method for a wireless communication system to configure service of a user equipment device ("UE"), wherein the system supports a first radio access technology ("RAT") and a second RAT, including operation on carriers according to the first RAT ("first-RAT carriers") and operation on one or more carriers according to the second RAT ("second-RAT carrier(s)"), the method comprising:

serving, by the system, the UE with dual-connectivity on
(i) a first-RAT carrier and (ii) a second-RAT carrier;

selecting, by the system, an additional first-RAT carrier to aggregate with the first-RAT carrier of the dual-connectivity service, wherein the UE is not yet served on the additional first-RAT carrier, and wherein the selecting includes (i) determining a level of load attributable to standalone first-RAT service on the additional first-RAT carrier, and (ii) selecting the additional first-RAT carrier based at least on the determined level of load attributable to standalone first-RAT service on the additional first-RAT carrier being predefined-threshold low; and configuring, by the system, carrier-aggregation service of the UE on at least (i) the first-RAT carrier of the dual-connectivity service and (ii) the selected additional first-RAT carrier.

2. The method of claim 1, wherein the first RAT is 4G LTE and the second RAT is 5G NR.

3. The method of claim 1, wherein determining the level of load attributable to standalone first-RAT service on the additional first-RAT carrier comprises:

identifying instances of service on the additional first-RAT carrier based on the identified instances of service being for one or more UEs that support standalone service on the first RAT and that do not support dual-connectivity on the first RAT and the second RAT; and based on the identifying, determining the level of load as load attributable to the identified instances of service.

4. The method of claim 1, wherein determining the level of load attributable to standalone first-RAT service on the additional first-RAT carrier comprises:

identifying instances of service on the first-RAT carrier based on the identified instances of service being for one or more UEs engaged in standalone communication on the first RAT rather than dual-connectivity service on the first RAT and the second RAT; and based on the identifying, determining the level of load as load attributable to the identified instances of service.

5. The method of claim 1, wherein determining the level of load attributable to standalone first-RAT service on the additional first-RAT carrier comprises determining the level of load attributable to standalone first-RAT service on the additional first-RAT carrier based on the standalone first-RAT service having predefined-threshold high priority.

6. The method of claim 1, wherein configuring the carrier-aggregation service of the UE on at least (i) the first-RAT carrier of the dual-connectivity service and (ii) the selected additional first-RAT carrier comprises:

transmitting to the UE a control signal that informs the UE of the inclusion of the selected additional first-RAT carrier in a connection of the UE; and updating a base station context record for the UE to indicate the inclusion of the selected additional first-RAT carrier in the connection of the UE.

7. The method of claim 1, wherein selecting the additional first-RAT carrier comprises excluding, from the selecting, a particular first-RAT carrier based on a determination that the particular first-RAT carrier has a predefined-threshold high level of load attributable to standalone first-RAT service.

8. A method for controlling carrier-aggregation in a system in which a cell site supports operation according to a first radio access technology ("RAT") and operation according to a second RAT and the cell site is configured to provide wireless service on a plurality of carriers according to the first RAT ("first-RAT carriers") and on at least one carrier according to the second RAT ("second-RAT carrier"), the method comprising:

when the cell site provides a user equipment device ("UE") with dual-connectivity service on at least one of the first-RAT carriers and the second-RAT carrier, selecting by the system, from the plurality of first-RAT carriers, an additional first-RAT carrier to aggregate with the at least one first-RAT carrier of the dual-connectivity service; and configuring, by the system, service of the UE to aggregate the selected additional first-RAT carrier with the at least one first-RAT carrier of the dual-connectivity service, wherein the selecting comprises (i) for each of multiple candidate first-RAT carriers on which the UE is not served, determining a respective level of load based on the level of load being attributable to standalone first-RAT service on the candidate first-RAT carrier, (ii) identifying a subset of the candidate first-RAT carriers based on the determined respective level of load of each member of the subset being predefined-threshold low, and (iii) selecting from the identified subset the additional first-RAT carrier to aggregate with the at least one first-RAT carrier of the dual-connectivity service.

9. The method of claim 8, wherein the first RAT is 4G LTE and the second RAT is 5G NR.

10. The method of claim 8, wherein determining the level of load based on the level of load being attributable to standalone first-RAT service on the candidate first-RAT carrier comprises:

identifying instances of service on the candidate first-RAT carrier based on the identified instances of service being for one or more UEs that support standalone service on the first RAT and that do not support dual-connectivity on the first RAT and the second RAT; and based on the identifying, determining the level of load as load attributable to the identified instances of service.

11. The method of claim 8, wherein determining the level of load based on the level of load being attributable to standalone first-RAT service on the candidate first-RAT carrier comprises:

identifying instances of service on the candidate first-RAT carrier based on the identified instances of service being for one or more UEs engaged in standalone communication on the first RAT rather than dual-connectivity service on the first RAT and the second RAT; and based on the identifying, determining the level of load as load attributable to the identified instances of service.

12. The method of claim 8, wherein determining the level of load based on the level of load being attributable to standalone first-RAT service on the candidate first-RAT carrier comprises determining the level of load attributable to standalone first-RAT service on the candidate first-RAT carrier based on the standalone first-RAT service having predefined-threshold high priority.

13. The method of claim 8, wherein configuring service of the UE to aggregate the selected additional first-RAT carrier with the at least one first-RAT carrier of the dual-connectivity service comprises:

transmitting to the UE a control signal that informs the UE of the inclusion of the selected additional first-RAT carrier in a connection of the UE; and updating a base station context record for the UE to indicate the inclusion of the selected additional first-RAT carrier in the connection of the UE.

14. The method of claim 8, wherein selecting the additional first-RAT carrier comprises excluding, from the selecting, a particular first-RAT carrier based on a determination that the particular first-RAT carrier has a predefined-threshold high level of load attributable to standalone first-RAT service.

15. A wireless communication system comprising:
a first base station configured to provide wireless service according to a first radio access technology ("RAT"), wherein the first base station operates on a plurality of carriers according to the first RAT ("first-RAT carriers"); and
a second base station configured to provide wireless service according to a second RAT, wherein the second base station operates on at least one carrier according to the second RAT,
wherein the first base station includes a controller having a processing unit programmed to cause the first base station to carry out operations including:
when the first base station is serving a user equipment device ("UE") with a first-RAT connection on at least one of the first-RAT carriers concurrently with the second base station serving the UE with a second-RAT connection on the second-RAT carrier, selecting an additional first-RAT carrier on which to provide the UE with carrier-aggregation service of the UE together with the at least one-RAT carrier,
based on the selecting, configuring and providing carrier-aggregation service of the UE on the at least one first-RAT carrier together with the selected additional first-RAT carrier, while the second base station continues to serve the UE with the second-RAT connection on the second-RAT carrier,
wherein the selecting includes (i) for each of multiple candidate first-RAT carriers on which the UE is not served, determining a respective level of load based on the level of load being attributable to standalone first-RAT service on the candidate first-RAT carrier, (ii) identifying a subset of the candidate first-RAT carriers based on the determined respective level of load of each member of the subset being predefined-threshold low, and (iii) selecting from the identified subset the additional first-RAT carrier to aggregate with the at least one first-RAT carrier.

16. The system of claim 15, wherein the first base station controls dual-connectivity service of the UE by the first base station and the second base station.

17. The system of claim 15, wherein determining the level of load based on the level of load being attributable to standalone first-RAT service on the candidate first-RAT carrier comprises:
identifying instances of service on the candidate first-RAT carrier based on the identified instances of service being for one or more UEs that support standalone service on the first RAT and that do not support dual-connectivity on the first RAT and the second RAT; and
based on the identifying, determining the level of load as load attributable to the identified instances of service.

18. The system of claim 15, wherein determining the level of load based on the level of load being attributable to standalone first-RAT service on the candidate first-RAT carrier comprises:
identifying instances of service on the candidate first-RAT carrier based on the identified instances of service being for one or more UEs engaged in standalone communication on the first RAT rather than dual-connectivity service on the first RAT and the second RAT; and
based on the identifying, determining the level of load as load attributable to the identified instances of service.

19. The system of claim 15, wherein determining the level of load based on the level of load being attributable to standalone first-RAT service on the candidate first-RAT carrier comprises determining the level of load attributable to standalone first-RAT service on the candidate first-RAT carrier based on the standalone first-RAT service having predefined-threshold high priority.

20. The system of claim 15, wherein selecting the additional first-RAT carrier comprises excluding, from the selecting, a particular first-RAT carrier based on a determination that the particular first-RAT carrier has a predefined-threshold high level of load attributable to standalone first-RAT service.

* * * * *